(12) United States Patent
Holloway et al.

(10) Patent No.: US 10,069,787 B2
(45) Date of Patent: Sep. 4, 2018

(54) DOMAIN NAME SYSTEM CNAME RECORD MANAGEMENT

(71) Applicant: CLOUDFLARE, INC., San Francisco, CA (US)

(72) Inventors: Lee Hahn Holloway, Santa Cruz, CA (US); Ray Raymond Bejjani, San Francisco, CA (US); Dane Orion Knecht, San Francisco, CA (US); Matthew Browning Prince, San Francisco, CA (US); John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 386 days.

(21) Appl. No.: 14/676,631

(22) Filed: Apr. 1, 2015

(65) Prior Publication Data

US 2015/0281168 A1 Oct. 1, 2015

Related U.S. Application Data

(60) Provisional application No. 61/973,811, filed on Apr. 1, 2014.

(51) Int. Cl.
*G06F 15/173* (2006.01)
*H04L 29/12* (2006.01)

(52) U.S. Cl.
CPC ...... *H04L 61/1511* (2013.01); *H04L 61/1552* (2013.01)

(58) Field of Classification Search
CPC .................................................. H04L 61/1552
See application file for complete search history.

(56) References Cited

U.S. PATENT DOCUMENTS

| 7,343,397 B2* | 3/2008 | Kochanski | G06Q 30/06 709/203 |
| 7,574,508 B1 | 8/2009 | Kommula | |
| 2004/0194102 A1 | 9/2004 | Neerdaels | |
| 2011/0078327 A1* | 3/2011 | Li | H04L 29/12066 709/238 |

OTHER PUBLICATIONS

P. Mockapetris, Domain Names—Concepts and Facilities, Network Working Group, Request for Comments: 1034, Nov. 1987, 55 pages.

(Continued)

*Primary Examiner* — Ryan Jakovac
(74) *Attorney, Agent, or Firm* — Nicholson De Vos Webster & Elliott LLP

(57) ABSTRACT

A method and apparatus for managing CNAME records such that CNAME records at the root domain are supported while complying with the RFC specification (an IP address is returned for any Address query for the root record). The authoritative DNS infrastructure acts as a DNS resolver where if there is a CNAME at the root record, rather than returning that record directly, a recursive lookup is used to follow the CNAME chain until an A record is located. The address associated with the A record is then returned. This effectively "flattens" the CNAME chain. This complies with the requirements of the DNS specification and is invisible to any service that interacts with the DNS server.

18 Claims, 9 Drawing Sheets

(56) References Cited

OTHER PUBLICATIONS

P. Mockapetris, Domain Names—Implementation and Specification, Network Working Group, Request for Comments: 1035, Nov. 1987, 55 pages.
D. Barr, Common DNS Operational and Configuration Errors, Network Working Group, Request for Comments: 1912, Feb. 1996, 16 pages.
A. Eden, Introducing the ALIAS Record—Naked Domain Aliasing that Works!, DNSimple Blog, Nov. 10, 2011, 4 pages.

* cited by examiner

DNS RECORDS FOR "EXAMPLE.NET" 610

| NAME | RECORD TYPE | TYPE SPECIFIC DATA | CLASS | TTL |
|---|---|---|---|---|
| EXAMPLE.NET | CNAME | X1234.EXAMPLE.COM | IN | 3600 |
| EXAMPLE.NET | MX | MAIL.EXAMPLE.NET | IN | 3600 |
| MAIL.EXAMPLE.NET | CNAME | MAIL.EXAMPLE.COM | IN | 3600 |
| EXAMPLE.NET | NS | NS.NAMESERVER.COM | IN | 3600 |
| EXAMPLE.NET | SOA | NS.NAMESERVER.COM | IN | 3600 |

DNS RECORDS FOR "EXAMPLE.COM" 620

| NAME | RECORD TYPE | TYPE SPECIFIC DATA | CLASS | TTL |
|---|---|---|---|---|
| X1234.EXAMPLE.COM | A | 198.51.100.1 | IN | 3000 |
| MAIL.EXAMPLE.COM | A | 198.51.100.2 | IN | 3000 |
| EXAMPLE.COM | NS | NS2.EXAMPLE.COM | IN | 3000 |
| EXAMPLE.COM | SOA | NS2.EXAMPLE.COM | IN | 3000 |

FIG. 6

DOMAIN NAME SYSTEM CNAME RECORD MANAGEMENT

CROSS-REFERENCE TO RELATED APPLICATIONS

This application claims the benefit of U.S. Provisional Application No. 61/973,811 filed Apr. 1, 2014, which is hereby incorporated by reference.

FIELD

Embodiments of the invention relate to the field of network communication; and more specifically, to managing Domain Name System (DNS) CNAME records.

BACKGROUND

The Domain Name System (DNS) is used for translating domain names into IP addresses and is an essential part of the Internet. A root domain (sometimes referred to as a "naked domain" or "apex domain") is the top domain that is commonly subdivided into smaller domains that are sometimes referred to as subdomains. For example a root domain may be "example.com" and a subdomain may be "www.example.com". Traditionally the root record for a domain needed to point to an IP address (either an A record for IPv4 or an AAAA record for IPv6). However tying a service to an IP address can be extremely limiting. By way of example, a new blogging platform BlogExample starts up that allows its users to use custom domains that point to the BlogExample infrastructure (either through the use of subdomains such as "customer1.blogexample.com" or other domains such as "example.net" that point to the BlogExample infrastructure). Since IP addresses are limited, as more and more customers sign up for the service more IP address are shared between multiple customers. Also, providing an IP address to each customer reduces flexibility in that it is difficult to change the IP address assigned to the customer later if the need arises without causing problems for the customer.

Virtual hosting is a technique where multiple websites (multiple domains) are hosted on a single server. Name-based virtual hosting is a technique where multiple domains share the same IP address. ISPs (Internet Service Providers) that provide hosting capabilities for relatively small websites commonly use virtual hosting as a way to share the cost of resources. Virtual hosting is also commonly used in data centers. Through the use of virtual hostnames BlogExample can return different content for different domains even hosted on the same IP address.

Since multiple domains may share the same IP address, the traffic of each individual domain may indirectly affect the other domains on that IP address. For example, if one of those domains, called "Example.net" in this example, starts to receive heavy traffic (e.g., "Example.net" is being attacked in a Denial of Service attack or otherwise experiencing a large amount of traffic), the other domains may be experiencing poor performance because they are sharing the same resource as the overwhelmed domain. Traditionally the solution in this circumstance is to either change the DNS settings for the overwhelmed domain or the other domains, which may not be practical and difficult in a business environment.

A CNAME (Canonical Name) record is an alias that allows one domain to point to another domain which eventually will resolve to an A record (or AAAA record) and IP address. Using the example above, if BlogExample had handed out a unique CNAME for every customer then there would not be a problem encountered by the shared resource. For example, BlogExample might have assigned the CNAME "x1234.blogexample.com" for "example1.com" and the CNAME "y1234.blogexample.com" for "example2.com". "example1.com" and "example2.com" both resolve to the same IP address (if following to the end of the CNAME chain). If "example1.com" started using too many resources that adversely affects the performance of "example2.com", BlogExample could have updated the CNAME and isolated "example1.com" from the rest of the customers on that IP address.

CNAMEs work well for subdomains like "www.example.com" and "blog.example.com", but do not work for a root domain like "example.com" itself. RFC 1035, "Domain Names—Implementation and Specification", November 1987, and other DNS RFCs (collectively referred herein as the DNS specification) specifies that the root record (for the root domain without any subdomain) needs to be an A record and point directly to an IP address. Since most authoritative DNS servers follow the DNS specification, they do not allow CNAME records at the root to be included. This means that with most DNS providers a subdomain CNAME that points to another domain may be established, but another domain cannot be a CNAME to the root domain. For example, you may set up a CNAME to point "www.example.com" to "x1234.BlogExample.com" but you cannot set up a CNAME from the root domain "example.com" to "x1234.BlogExample.com".

Some providers allow their customers to include a CNAME at the root even though it violates the DNS specification. However doing so causes problems in certain circumstances where other systems are following the DNS specification.

BRIEF DESCRIPTION OF THE DRAWINGS

The invention may best be understood by referring to the following description and accompanying drawings that are used to illustrate embodiments of the invention. In the drawings:

FIG. 6 illustrates exemplary DNS records;

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

A method and apparatus for managing CNAME records such that CNAME records at the root domain are supported while complying with the RFC specification (an IP address is returned for any Address query such as a query for an A record or an AAAA record for the root record). In one embodiment, the authoritative DNS infrastructure acts as a DNS resolver where if there is a CNAME at the root record, rather than returning that record directly, a recursive lookup is used to follow the CNAME chain until an Address record (e.g., A or AAAA record) is located. The address associated with the Address record is then returned. This effectively "flattens" the CNAME chain. This complies with the requirements of the DNS specification and is invisible to any service that interacts with the DNS server.

The DNS responses may be cached (e.g., according to the Time to Live (TTL) values of the DNS records) which means that often the answer can be found from the cache instead of traversing the chain. In some embodiments, CNAME flattening applies to any or all of the CNAME records.

Figure 1:
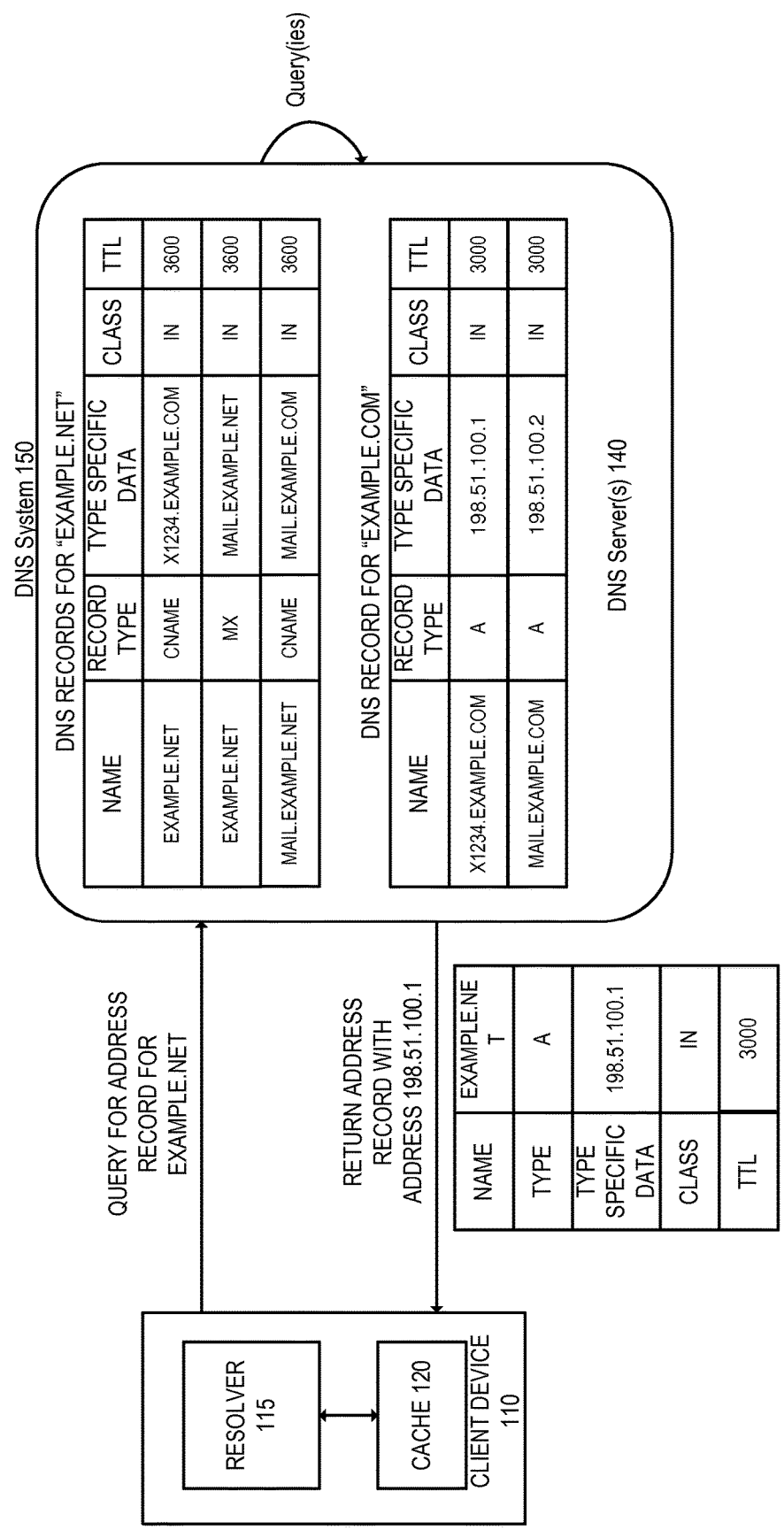
FIG. 1 illustrates an example for DNS resolution using techniques described herein for managing CNAME records according to one embodiment.

FIG. 1 illustrates an example for DNS resolution using techniques described herein for managing CNAME records according to one embodiment. FIG. 1 includes a client device 110 and one or more DNS servers 140 that compose a DNS system 150. The client device is a device that queries the DNS system 150. The client device may be a desktop, laptop, smartphone, etc. that is operated by an end user. The client device includes client programs that access the Internet such as a web browser or email application. For example, a user may input a domain name into the address bar of their browser (e.g., http://www.example.com) to access that page, which causes the browser to make a request for the IP address mapped to that domain name.

The DNS system 150 is used to refer to the DNS system as a whole and includes multiple DNS servers to answer DNS queries. The DNS system 150 may include authoritative name servers, preferred domain servers, top-level domain name servers, or other domain servers. It should also be understood that there may be multiple authoritative web servers that may be geographically distributed.

The client device 110 also includes a resolver 115 that receives a request from the client program for the IP address associated with the requested domain and attempts to locate that IP address. The resolver 115 may be part of the operating system of the client device 110 and may be connected to multiple client programs (email program(s), browser(s), etc.). The user query from the client program is typically an operating system call to the resolver 115. The resolver 115 also could be built into the client program. The resolver is not exposed to the end user. The resolver 115 transmits a DNS query to one or more DNS servers. Typically the resolver starts with knowledge of at least one name server, which may be configured as part of the settings of the operating system. When the resolver 115 processes a user query it asks the known name server for the information; in return, the resolver 115 either receives the desired information (the IP address for the domain) or a referral to another name server. Using these referrals, the resolver 115 learns the identities and contents of other name servers and ultimately the answer to the query. The resolver may need to make several queries to several different name servers to answer the original user query. The resolver 115 may also use a cache 120 that is generated from previous queries. The time each record is valid is set by a time-to-live (TTL) value associated with the record. If the cache 120 includes a valid record that answers the query, the resolver 115 locally returns the IP address to the client program. When a DNS server receives a query it checks whether it can authoritatively answer the query. The DNS server may also itself have a cache of results of previous queries which it can check for the answer. If the DNS server can authoritatively answer the query or has a cached answer, then it may answer the query. If the DNS server cannot authoritatively answer the query and does not have a cached answer, the DNS server may query another name server for the answer, often known as recursive resolving.

In the example of FIG. 1, the client device 110 transmits a query for an address record (e.g., A or AAAA record) for a domain (in this example "example.net") to the DNS system 150. The query may be received by a recursive DNS server that is part of the DNS system 150 and is typically provided by the Internet Service Provider of the client device 110. FIG. 1 illustrates a portion of exemplary DNS records for the domain "example.net" and the domain "example.com". Different DNS servers may be authoritative for the domains "example.net" and "example.com". As illustrated in FIG. 1, "x1234.example.com" is a CNAME of the root domain "example.net". To say it another way, the root domain "example.net" is an alias of "x1234.example.com". Returning the CNAME answer to the client device 110 is not valid according to the DNS specification. Instead, the DNS system 150 traverses the CNAME chain until it finds an Address record and returns the IP address associated with that located Address record for "example.net". As illustrated in FIG. 1, the domain "x1234.example.com" is associated with an Address record with an address of 198.51.100.1. The DNS System 150 returns an Address record with the address 198.51.100.1 to the client device 110, which is what is expected by the client device 110 and complies with the DNS specification. The client device 110 may cache the response. The client device 110 does not have knowledge that the domain "example.net" had a CNAME record that pointed to a different domain. To say it another way, from the perspective of the client device 110, the DNS query results in an Address record for the domain "example.net" even though there is not an explicit Address record for the domain "example.net."

As described above the DNS system 150 may include an authoritative name server that is authoritative for both the requested domain ("example.net") and another domain that is a CNAME of the requested domain ("example.com"). By way of example, upon receiving a DNS request for the Address record for the domain "example.net" and determining that "example.net" is an alias of "x1234.example.com", the authoritative name server performs a local lookup to determine the record for "x1234.example.com" and returns the answer to the requester. By way of a specific example, if the query is for an A record for "example.net", the authoritative name server determines that the root domain "example.net" has a CNAME record that points to the domain "x1234.example.com". Since the name server is also the authoritative named server for "example.com", the name server locally looks up the domain "x1234.example.com" and determines that it has a CNAME record that points to the domain "example.com" that itself has an A record that points to 198.51.100.1. The name server then returns a response with an A record with an address 198.51.100.1 to the requester.

Figure 2:
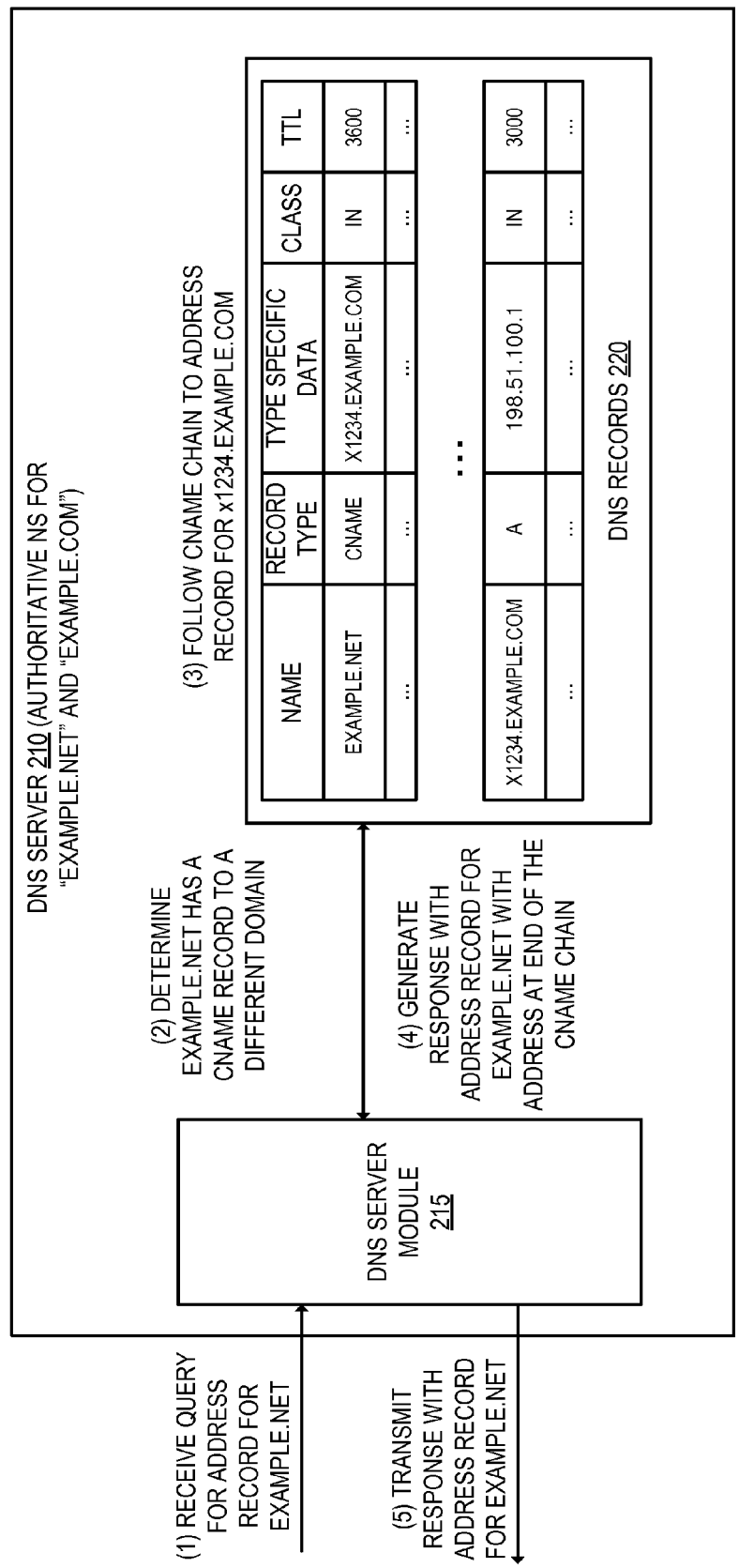
FIG. 2 illustrates a DNS server answering a query for an Address record using CNAME flattening according to one embodiment.

For example, FIG. 2 illustrates the DNS server 210, which is the authoritative name server for "example.net" and "example.com" answering a query for an Address record using CNAME flattening as described herein. At operation 1, the DNS server module 215 of the DNS server 210 receives a query for an Address record (e.g., an A or AAAA record) for the domain name "example.net". The query may be received from a DNS client or from another DNS server. Since the DNS server 210 is authoritative for the domain name "example.net" it will be able to provide the answer to the query. At operation 2 the DNS server module 215 accesses its local DNS records 220 and determines that the domain name "example.net" has a CNAME record to a different domain (in this case "x1234.example.com"). At operation 3 the DNS server module 215 follows the CNAME chain until it locates the Address record (in this case an A record) at the end of the chain for the domain name "x1234.example.com". In this example there is only a single link in the CNAME chain; however it should be understood that there may be multiple links in the CNAME chain. At an operation 4 the DNS server module 215 generates a response with an Address record for the domain name "example.net" that includes the IP address associated with the Address record at the end of the CNAME chain (in this case the address included in the A record for the domain name "x1234.example.com", which is 198.51.100.1). At operation 5, the DNS server module 215 transmits the response to the query with an Address record for the domain name "example.net" with an address of 198.51.100.1.

Figure 3:
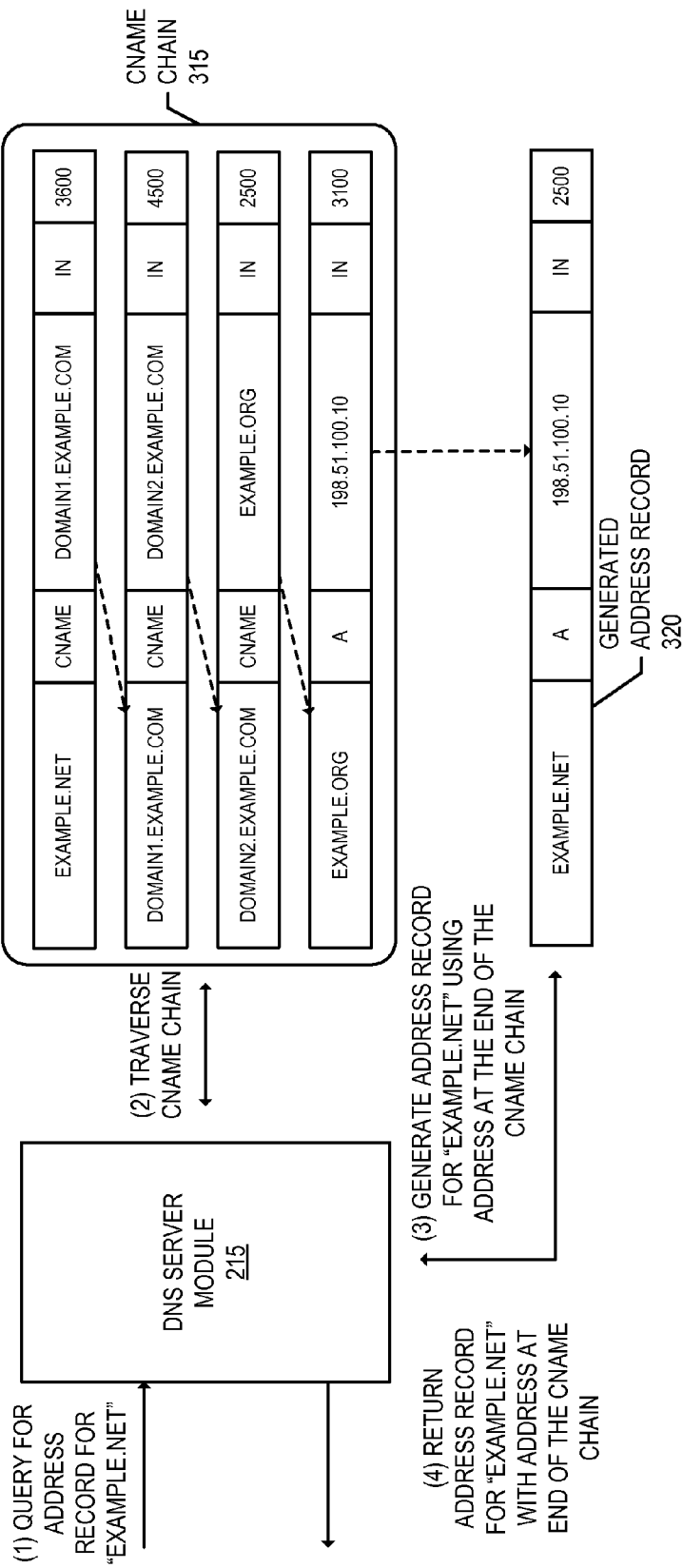
FIG. 3 illustrates traversing a CNAME chain with multiple links and generating an Address record according to one embodiment.

As described above there may be multiple links in the CNAME chain that may be flattened. FIG. 3 illustrates traversing a CNAME chain with multiple links and generating an Address record according to one embodiment. At an operation 1 of FIG. 3, the DNS server module 215 of the DNS server 210 receives a query for an Address record (e.g., an A or AAAA record) for the domain name "example.net" in a similar way as previously described. The DNS server module 215 determines that the domain "example.net" has a CNAME record to a different domain (in this case "domain1.example.com").

At operation 2 of FIG. 3, the DNS server module 215 traverses the CNAME chain until it locates the Address record. The CNAME chain 315 conceptually illustrates the chain that is followed by the DNS server module 215. Specifically, the domain name "example.net" has a CNAME record that points to the CNAME "domain1.example.com", the domain name "domain1.example.com" has a CNAME record that points to the CNAME "domain2.example.com", the domain name "domain2.exmaple.com" has a CNAME record that points to the CNAME "example.org", and the domain name "example.org" has an A record with an IP address value of 198.51.100.10. Thus traversing the CNAME chain 315 ultimately concludes with an IP address of 198.51.100.10. The traversal may be a combination of the DNS server module 215 accessing its local DNS records and cache for the records and querying other DNS server(s) for records. For example, the DNS server module 215 will be able to access its local records for a particular domain if the DNS server is the authoritative name server for the domain or if it has non-expired cached records for the domain. If the DNS server module 215 does not have local access to a particular record, it may query other DNS server(s) for the record.

At operation 3 of FIG. 3, the DNS server module 215 generates an Address record for the domain name "example.net" using at least the address at the end of the CNAME chain 315 (e.g., 198.51.100.10). A representation of the generated address record 320 is illustrated which shows the name value to be "example.net", the type value to be "A", the type specific data to be the IP address 198.51.100.10, and the TTL value to be 2500. As illustrated in FIG. 3, the records in the CNAME chain 315 may have different TTL values. In one embodiment, when generating the address record, the DNS server module 215 uses the TTL value that has the smallest value in the CNAME chain (which is illustrated in the generated address record 320). In another embodiment, the DNS server module 215 uses the TTL value that has the largest value in the CNAME chain when generating the address record. In another embodiment, the DNS server module 215 sets the TTL value for the generated record to some predefined maximum TTL value, which may be different than any of the TTL values in the CNAME chain.

At operation 4 of FIG. 3, the DNS server module 215 returns the generated Address record for "example.net" to the requester. The DNS server module 215 may cache the generated address record 320 so that it may respond locally and avoid traversing the CNAME chain when responding to subsequent requests for the Address record for "example.net" (and respecting the TTL associated with the generated address record).

In some cases, the authoritative name server for the requested domain ("example.net") may be different than the authoritative name server for the other domain that is a CNAME of the requested domain ("example.com"). By way of example, upon receiving a DNS request for the Address record for the domain "example.net", the authoritative name server for "example.net" determines that "example.net" is an alias of "x1234.example.com". If the name server does not have a cached answer (e.g., a valid cached answer according to the TTL of the record associated with "x1234.example.com"), the name server queries another name server for the answer (e.g., the name server that is authoritative for the domain "x1234.example.com"). The name server receives the answer (e.g., an A record that points to 198.51.100.1) and may cache the answer according to the TTL associated with the record. The name server returns a response with the Address record (e.g., A record with an address 198.51.100.1) to the requester.

Figure 4:
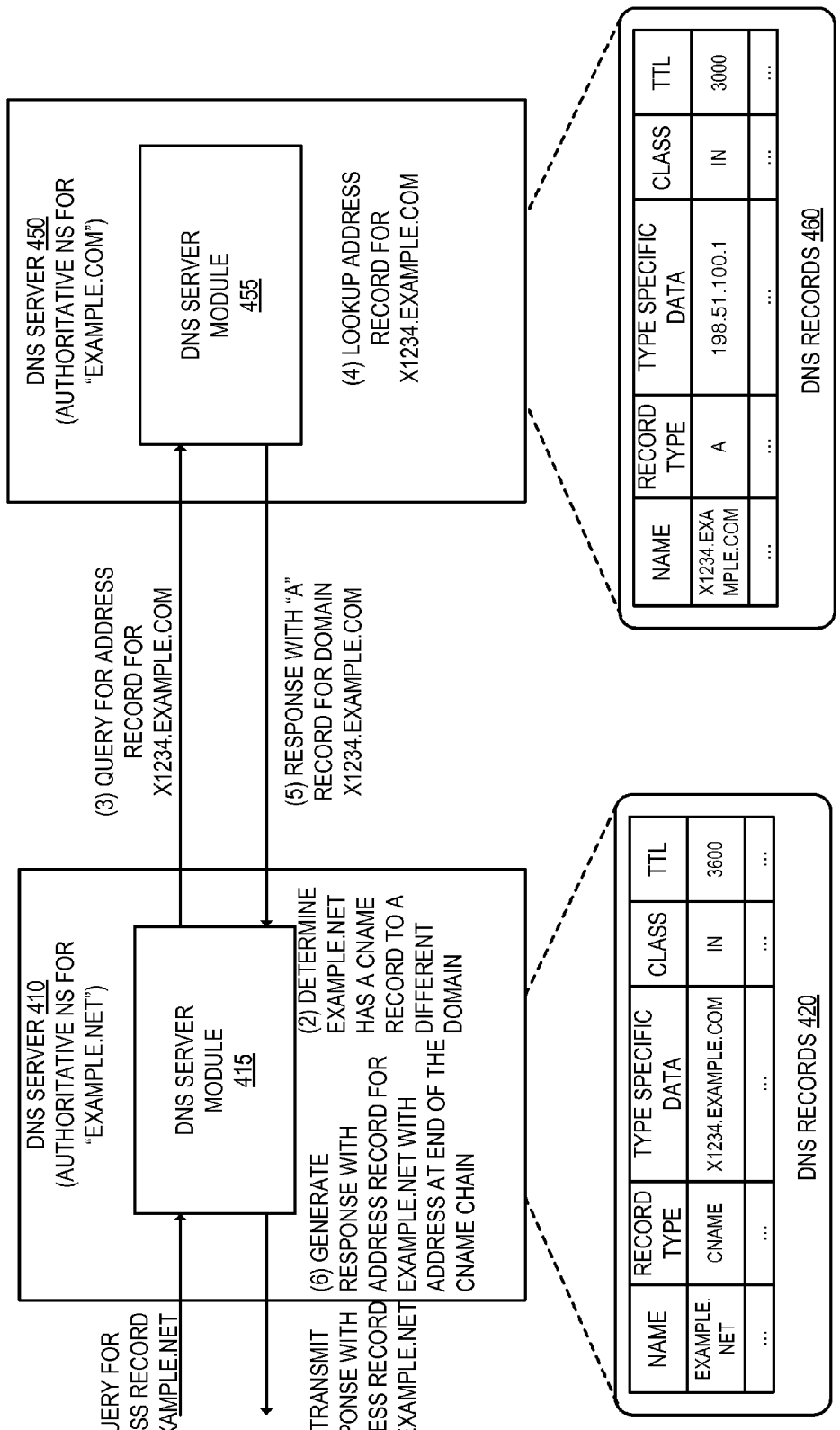
FIG. 4 illustrates a DNS server with is the authoritative name server for a requested domain performing CNAME flattening according to one embodiment.

For example, FIG. 4 illustrates the DNS server 410, which is the authoritative name server for "example.net", and the DNS server 450, which is the authoritative name server for "example.com". The DNS server 410 is answering a query for an Address record using CNAME flattening as described herein. At operation 1, the DNS server module 415 of the DNS server 410 receives a query for an Address record (e.g., an A or AAAA record) for the domain name "example.net". The query may be received from a DNS client or from another DNS server. At operation 2 the DNS server module 415 accesses its local DNS records 420 and determines that the domain name "example.net" has a CNAME record to a different domain (in this case "x1234.example.com"). Since the DNS server 410 is not the authoritative name server for "x1234.example.com", at operation 3 the DNS server module 215 transmits a query for an Address record for the domain name "x1234.example.com" to the DNS server 450 which is the authoritative name server for that domain. At operation 4 the DNS server module 455 accesses its local DNS records 460 and locates an Address record (in this case an A record) for the domain name "x1234.example.com" and at operation 5 the DNS server module 455 transmits a response with the located Address record for the domain name "x1234.example.com". The DNS server module 410 receives the response with the Address record and at operation 6 generates a response that includes an Address record for the domain name "example.net" that has an IP address of 198.51.100.1 (the IP address included in the A record for domain name "x1234.example.com"). At operation 7, the DNS server module 415 transmits the response to the query with an Address record for the domain name "example.net" with an address of 198.51.100.1.

Although not illustrated in FIG. 4, in some embodiments the DNS server 410 includes a cache that will cache the response from the DNS server 450 in operation 5 for the Address record for "x1234.example.com". Upon receiving a subsequent request for an Address record for the domain name 'example.net", the DNS server 410 may access the cached Address record for the domain name "x1234.example.com" when generating the response (assuming that the TTL associated with the cached Address record is not expired).

Embodiments are not limited to flattening queries for only Address records as similar operations can be performed for queries for other record types such as MX records. As a specific example, even though an MX to CNAME is not allowed according to the DNS specification, in some embodiments this is allowed and a non-CNAME answer will be returned in response to an MX query. For example, upon receiving an MX query and determining that the MX record points to a CNAME record, the CNAME chain is followed until a non-CNAMEd answer is located. The answer to the MX query will not include the CNAME value but rather will include the non-CNAME answer.

Figure 5:
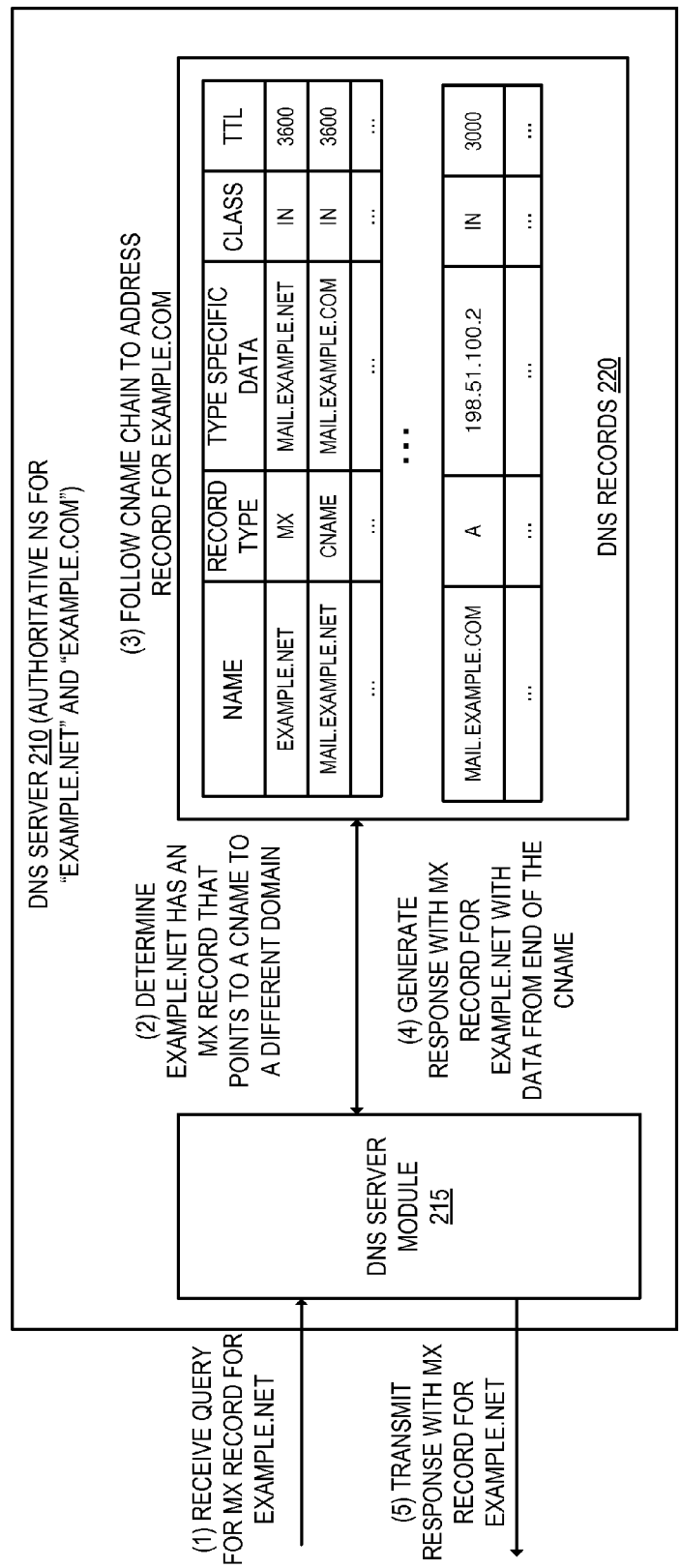
FIG. 5 illustrates a DNS server answering a query for an MX record using CNAME flattening according to one embodiment.

FIG. 5 illustrates the DNS server 210, which is the authoritative name server for "example.net" and "example.com" answering a query for an MX record using CNAME flattening as described herein. At operation 1 of FIG. 5, the DNS server module 215 of the DNS server 210 receives a query for an MX record for the domain name "example.net". The query may be received from a DNS client or from another DNS server. Since the DNS server 210 is authoritative for the domain name "example.net" it will be able to provide the answer to the query. At operation 2 of FIG. 5, the DNS server module 215 accesses its local DNS records 220 and determines that the domain name "example.net" has an MX record that points to a CNAME of a different domain. In particular, there is an MX record for the domain name "example.net" that specifies the mail exchange domain name of "mail.example.net"; however instead of the domain name "mail.example.net" having an Address record (e.g., an A or AAAA record), the domain name "mail.example.net" has a CNAME record to the domain name "mail.example.com". At operation 3 of FIG. 5, the DNS server module 215 follows the CNAME chain until it locates the record at the end of the chain. In this example, the record at the end of the chain is the CNAME record for the domain "mail.example.net" that points to the domain "mail.example.com". In this example there is only a single link in the CNAME chain; however it should be understood that there may be multiple links in the CNAME chain. At operation 4 of FIG. 5, the DNS server module 215 generates a response with an MX record for the domain name "example.net" with the mail exchange domain name of "mail.example.com". At operation 5 of FIG. 5, the DNS server module 215 transmits the response to the query with an MX record for the domain name "example.net" with the mail exchange domain name of "mail.example.com".

Embodiments are not limited to responding to requests for Address records. For example, a request may be made for any records for the domain "example.net" with an ANY query. The records for the domain "example.net" may include several different types such as A, MX (Mail Exchange), NS (Name Server), SOA (Start of Authority), CNAME, etc. In such a case, upon receiving a DNS ANY query for the domain "example.net" and determining that there is at least one CNAME record that points to another domain ("x1234.example.com"), the name server follows the CNAME chain to determine the records for the domain "x1234.example.com" until locating an Address record. Following the CNAME chain may include local lookup(s) if the name server is authoritative or if there is a valid cached response, and/or may include one or more queries to other name servers). If issuing an ANY query, there may be more than Address records returned for the other domain, especially if that other domain is a root domain (e.g., example.com). In such a case, the name server may not return all records to the requester in the response due to conflicting information. For example, in some embodiments SOA (Start of Authority) and NS records for the CNAME domain(s) are not included in the response to the requester. Also record types which are already included in the records for the requested domain "example.net" are not replaced with the records for the CNAME domain(s). For example, FIG. 6 illustrates exemplary DNS records 610 for the domain "example.net" and DNS records 620 for the domain "example.com". Upon receiving an ANY query for the domain "example.net", the name server locates the records 610 and determines that there is a CNAME for the domain "example.net" that points to "X1234.example.com", which itself has a CNAME to the domain "example.com". The domain "example.com" has multiple records including an A record, MX record, NS record, and a SOA record. Since the domain "example.net" already has an MX record, the response includes the MX record for the domain "example.net" and not the MX record for the domain "example.com".

Figure 7:
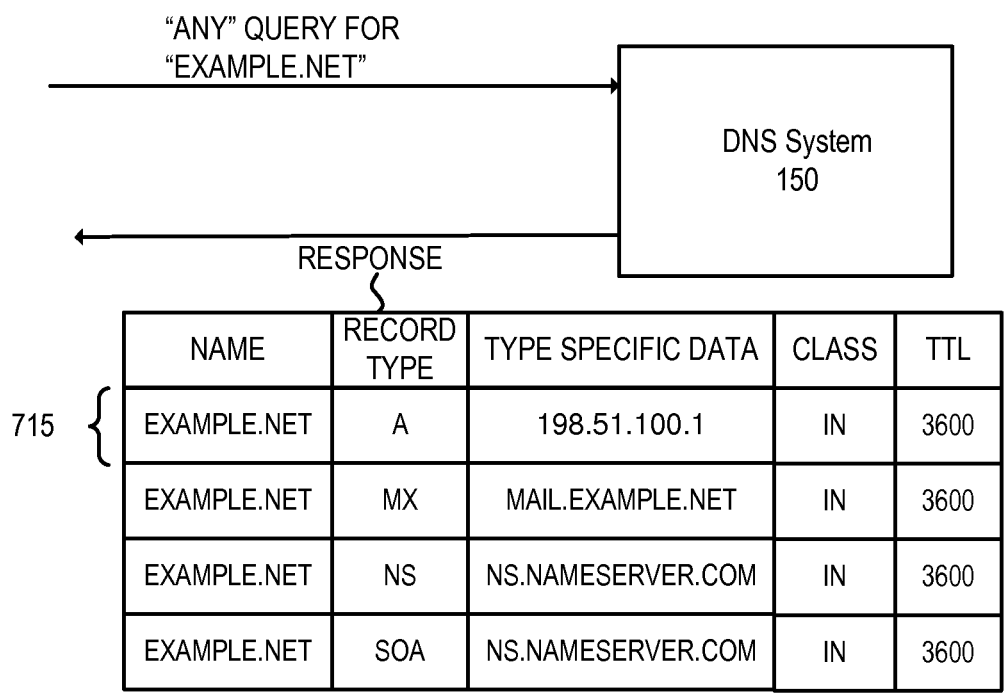
FIG. 7 illustrates an ANY query for the domain "example.net" assuming the domain records of FIG. 6 according to one embodiment.

FIG. 7 illustrates an ANY query for the domain "example.net" assuming the domain records of FIG. 6 according to one embodiment. The DNS system 150 receives the ANY query for the domain "example.net" and locates the records illustrated in FIG. 6. The DNS system 150 traverses the CNAME chain for "example.net" and determines that there are four records that correspond with "example.com" (an A record, an MX record, an NS record, and an SOA record). Since there is already an MX record, NS record, and SOA record for "example.net", the MX record, NS record, and SOA record for "example.com" will not be included in the response to the query. The Address record 715 for "example.net" in the response includes the address as specified in the Address record for "example.com".

Embodiments are not limited to applying only at the root domain level. In some embodiments, other non-root domain names may also be flattened. For example, if the subdomain "www.example.net" has a CNAME that points to another domain, a query for the subdomain "www.example.net" may be returned with a flattened response.

Figure 8:
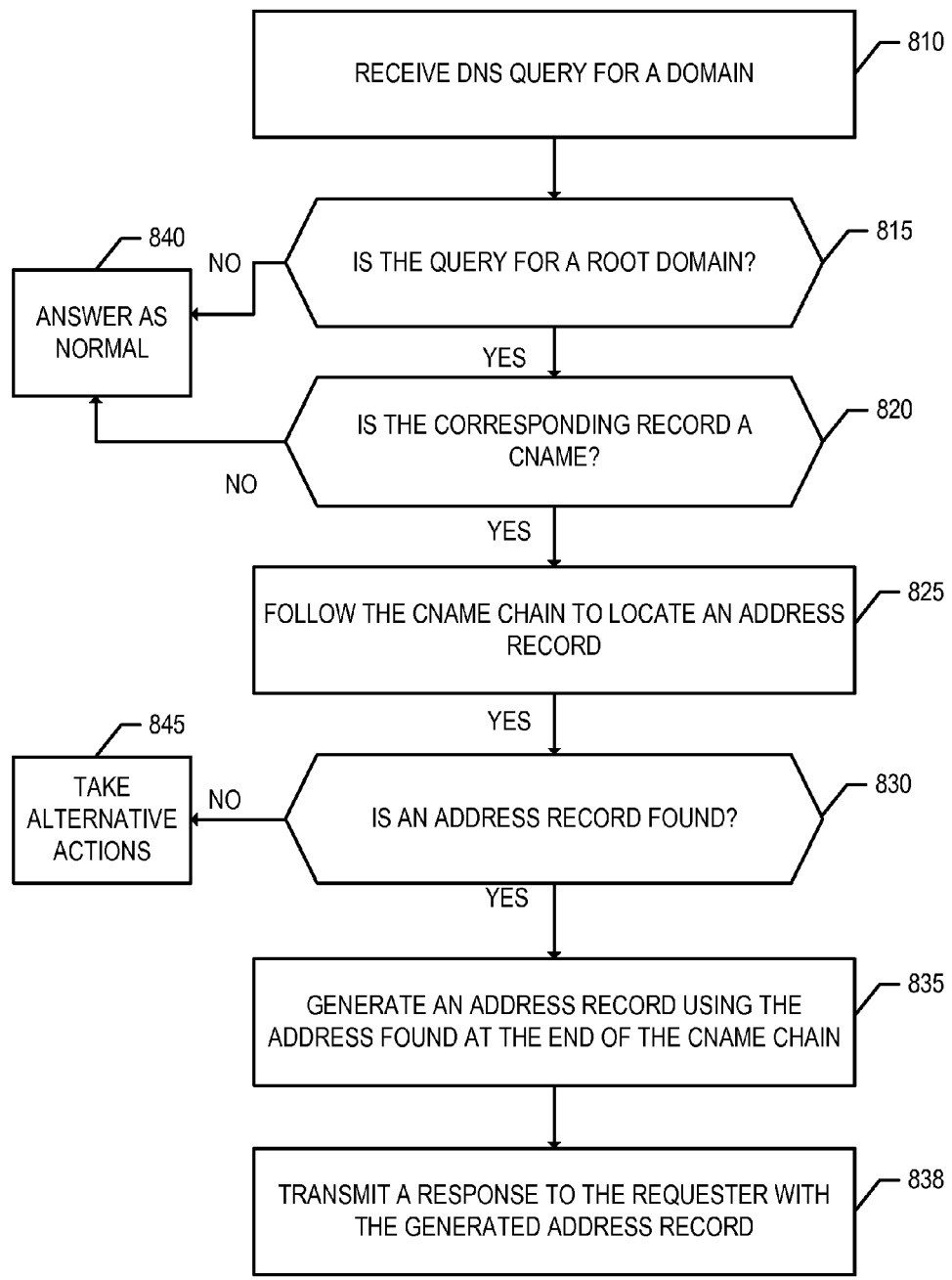
FIG. 8 is a flow diagram illustrating exemplary operations according to one embodiment.

FIG. 8 is a flow diagram illustrating exemplary operations according to one embodiment. The operations of FIG. 8 will be described with respect to being performed on name server that is authoritative for at least the requested domain. At operation 810, a DNS query is received for a domain (a fully qualified domain name (FQDN) or sometimes referred to as an absolute domain name) for which the name server is authoritative. The query may be received from a client device or from another DNS server. The DNS query may specify the query type such as an "A" query (requesting an A record) for the domain, an "MX" query (requesting an MX record) for the domain, an "ANY" query (requesting all records) for the domain, or other type of DNS query. In the example of FIG. 8, the query type is either for an Address record (e.g., an A or AAAA record) or an "ANY" query. Flow then moves to operation 815 where the name server determines whether the query is for a root domain. If it is not a root domain, then in one embodiment flow moves to operation 840 and the name server responds to the query in its normal fashion. If it is a root domain (e.g., "example.net"), then flow moves to operation 820 where the name server determines whether there is at least one corresponding record that is a CNAME record. If there is not at least one corresponding CNAME record for the requested domain, then flow moves to operation 840 where the name server responds to the query in its normal fashion. If there is a corresponding CNAME record for the domain, then flow moves to operation 825 where the name server follows the CNAME chain to locate an Address record. Following the CNAME chain may include performing one or more local lookups if the name server is authoritative for the other domain(s) referenced in the CNAME record chain and/or if there are valid entries in the name server's cache, and/or issuing one or more queries to one or more other name servers if the name is not authoritative for the other domain(s) referenced in the CNAME record chain.

At operation 830 a determination is made whether an Address record is found at the end of the CNAME chain. If an Address record is not found, then flow moves to operation 845 where alternative actions are taken (e.g., a response is sent that indicates that there is not an address found for the domain). If there is an authoritative name server that is not responding, but there is a record for the corresponding domain that is in cache but is past its TTL, then the name server may return the stale answer. If an Address record is found, then flow moves to operation 835 where the name server generates an Address record using at least the IP address found at the end of the CNAME chain. Flow then moves to operation 838 where the name server transmits a response that includes an answer to the query with the generated Address record that includes the IP address of the Address record found at the end of the CNAME chain.

The returned records include a TTL value. In one embodiment, the name server uses the TTL value that is included for the record on the other domain (the CNAME domain) instead of the TTL value that is included for the CNAME record itself. For example, the CNAME record for "example.net" that points to "X1234.example.com" has a TTL value of 3600, whereas the A record for "example.com" (which is at the end of the CNAME chain) has a TTL value of 3000. In one embodiment, the response to the query with the A record for "example.net" will have a TTL value of 3000. In another embodiment, the name server uses the TTL value that is the longest in the CNAME chain (in this example it would be 3600). In yet another embodiment, the name server enforces a maximum TTL which may be different (e.g., shorter) than the TTL values in the CNAME chain.

While FIG. 8 described operations with respect to receiving a query for an Address record, similar operations can be performed for queries for other record types (e.g., MX records or receiving ANY queries). As a specific example, even though an MX to CNAME is not allowed according to the DNS specification, in some embodiments this is allowed and a non-CNAME answer will be returned in response to an MX query. For example, upon receiving an MX query and determining that the MX record points to a CNAME record, the CNAME chain is followed until a non-CNAMEd answer is located. The answer to the MX query will not include the CNAME value but rather will include the non-CNAME answer.

Figure 9:
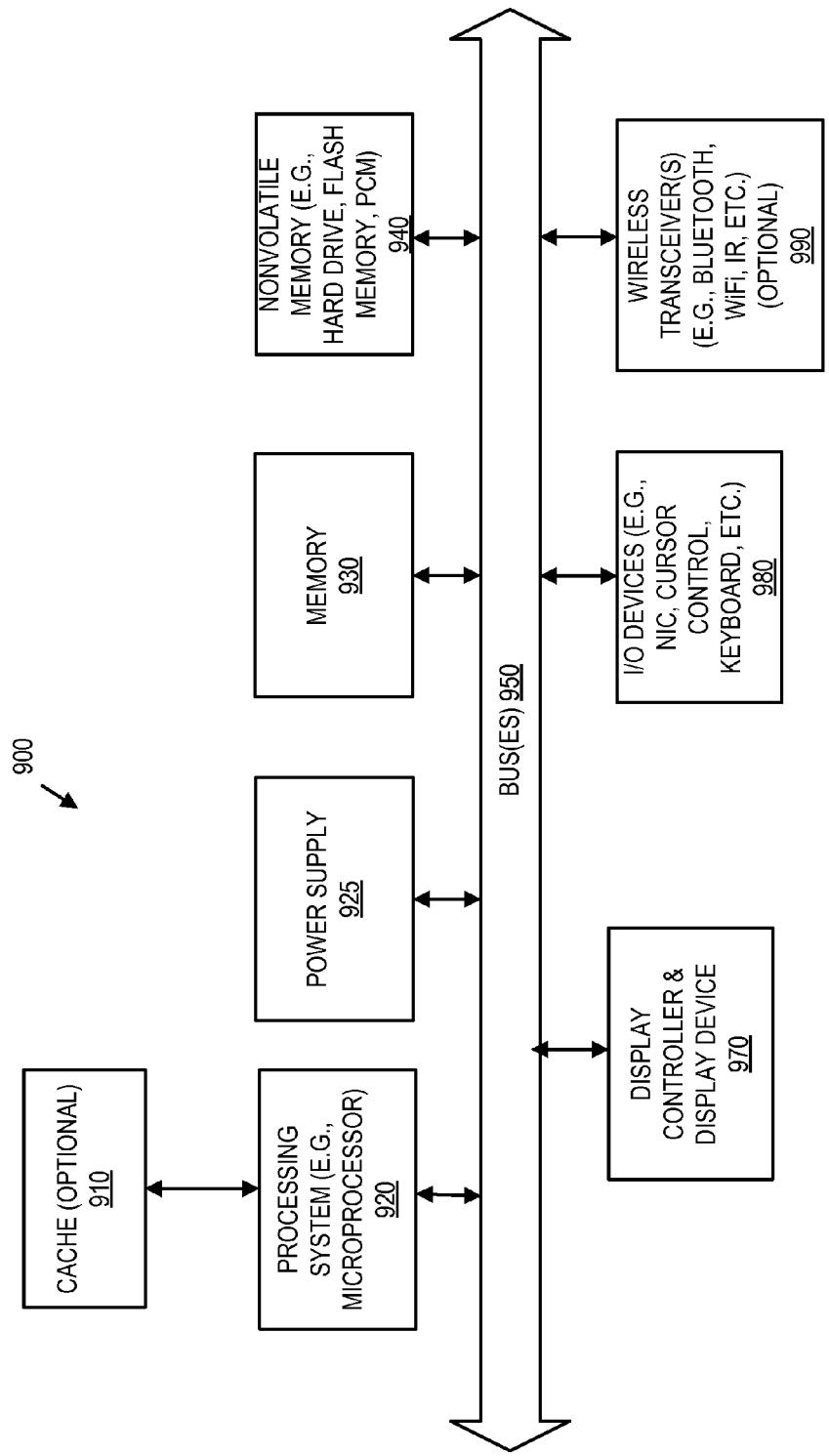
FIG. 9 illustrates an exemplary format of a computer system that may be used according to some embodiments.

As illustrated in FIG. 9, the computer system 900, which is a form of a data processing system, includes the bus(es) 950 which is coupled with the processing system 920, power supply 925, memory 930, and the nonvolatile memory 940 (e.g., a hard drive, flash memory, Phase-Change Memory (PCM), etc.). The bus(es) 950 may be connected to each other through various bridges, controllers, and/or adapters as is well known in the art. The processing system 920 may retrieve instruction(s) from the memory 930 and/or the nonvolatile memory 940, and execute the instructions to perform operations described herein. The bus 950 interconnects the above components together and also interconnects those components to the display controller & display device 970, Input/Output devices 980 (e.g., NIC (Network Interface Card), a cursor control (e.g., mouse, touchscreen, touchpad, etc.), a keyboard, etc.), and the optional wireless transceiver(s) 990 (e.g., Bluetooth, WiFi, Infrared, etc.). In one embodiment, the devices and/or the domain name servers may take the form of the computer system 900.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a Domain Name System (DNS) name server for managing Canonical Name (CNAME) records, comprising:
    receiving a first query for a first Address record for a fully qualified domain name from a requester;
    determining that the fully qualified domain name has a first CNAME record, wherein the fully qualified domain name is a root domain;
    traversing a chain according to the first CNAME record to locate a second Address record that includes a first IP address;
    generating a first response to the first query that includes a third Address record for the fully qualified domain name that includes at least the IP address of the located second Address record;
    transmitting the generated first response to the requester;
    receiving an ANY query for the fully qualified domain name from the requester;
    determining that the fully qualified domain name has at least one record that points to a second CNAME record;
    traversing a chain according to the second CNAME record to locate a fourth Address record that includes a second IP address;
    generating a second response to the received ANY query that includes the fourth Address record; and
    transmitting the generated second response to the requester.

2. An apparatus, comprising:
    a Domain Name System (DNS) name server including a set of one or more processors and a set of one or more non-transitory computer-readable storage mediums storing instructions that, when executed by the set of processors, cause the set of processors to perform the following operations:
        receive a first query for a first Address record for a fully qualified domain name from a requester;
        determine that the fully qualified domain name has a first Canonical Name (CNAME) record, wherein the fully qualified domain name is a root domain;
        traverse a chain according to the first CNAME record to locate a second Address record that includes a first IP address;
        generate a first response to the first query that includes a third Address record for the fully qualified domain name that includes at least the IP address of the located second Address record;
        transmit the generated first response to the requester;
        receive an ANY query for the fully qualified domain name from the requester;
        determine that the fully qualified domain name has at least one record that points to a second CNAME record;
        traverse a chain according to the second CNAME record to locate a fourth Address record that includes a second IP address;
        generate a second response to the received ANY query that includes the fourth Address record; and
        transmit the generated second response to the requester.

3. A non-transitory machine-readable storage medium that provides instructions that, when executed by a processor, cause the processor to perform operations comprising:
    receiving a first query for a first Address record for a fully qualified domain name from a requester;
    determining that the fully qualified domain name has a first Canonical Name (CNAME) record, wherein the fully qualified domain name is a root domain;
    traversing a chain according to the first CNAME record to locate a second Address record that includes a first IP address;
    generating a first response to the first query that includes a third Address record for the fully qualified domain name that includes at least the IP address of the located second Address record;
    transmitting the generated first response to the requester;
    receiving an ANY query for the fully qualified domain name from the requester;
    determining that the fully qualified domain name has at least one record that points to a second CNAME record;
    traversing a chain according to the second CNAME record to locate a fourth Address record that includes a second IP address;
    generating a second response to the received ANY query that includes the fourth Address record; and
    transmitting the generated second response to the requester.

4. The method of claim 1, wherein the generated first response further includes a first Time to Live (TTL) value that is equivalent to a second TTL value of the located second Address record.

5. The method of claim 1, wherein the generated first response further includes a Time to Live (TTL) value that is equivalent to a longest TTL value in the CNAME chain.

6. The method of claim 1, wherein the generated first response further includes a Time to Live (TTL) value that is smaller than each other TTL value in the CNAME chain.

7. The method of claim 1, further comprising:
    receiving a second query for an MX record for the fully qualified domain name from the requester;
    determining that the fully qualified domain name has an MX record that points to a second CNAME record;
    traversing a chain according to the second CNAME record to locate an end record of that chain, wherein the end record of that chain includes type specific data;
    generating a second response to the second query that includes the MX record pointed to the type specific data of the end record of that chain; and
    transmitting the generated second response to the requester.

8. The method of claim 1, further comprising caching the generated first response.

9. The apparatus of claim 2, wherein the generated first response is further to include a first Time to Live (TTL) value that is equivalent to a second TTL value of the located second Address record.

10. The apparatus of claim 2, wherein the generated first response is further to include a Time to Live (TTL) value that is equivalent to a longest TTL value in the CNAME chain.

11. The apparatus of claim 2, wherein the generated first response is further to include a Time to Live (TTL) value that is smaller than each other TTL value in the CNAME chain.

12. The apparatus of claim 2, wherein the set of one or more non-transitory computer-readable storage mediums further storing instructions that, when executed by the set of processors, cause the set of processors to perform the following operations:
   receive a second query for an MX record for the fully qualified domain name from the requester;
   determine that the fully qualified domain name has an MX record that points to a second CNAME record;
   traverse a chain according to the second CNAME record to locate an end record of that chain, wherein the end record of that chain includes type specific data;
   generate a second response to the second query that includes the MX record pointed to the type specific data of the end record of that chain; and
   transmit the generated second response to the requester.

13. The apparatus of claim 2, wherein the set of one or more non-transitory computer-readable storage mediums further storing instructions that, when executed by the set of processors, cause the set of processors to cache the generated first response.

14. The non-transitory machine-readable storage medium of claim 3, wherein the generated first response further is to include a first Time to Live (TTL) value that is equivalent to a second TTL value of the located second Address record.

15. The non-transitory machine-readable storage medium of claim 3, wherein the generated first response further is to include a Time to Live (TTL) value that is equivalent to a longest TTL value in the CNAME chain.

16. The non-transitory machine-readable storage medium of claim 3, wherein the generated first response further is to include a Time to Live (TTL) value that is smaller than each other TTL value in the CNAME chain.

17. The non-transitory machine-readable storage medium of claim 3, further storing instructions that, when executed by the processor, cause the processor to perform the following operations:
   receiving a second query for an MX record for the fully qualified domain name from the requester;
   determining that the fully qualified domain name has an MX record that points to a second CNAME record;
   traversing a chain according to the second CNAME record to locate an end record of that chain, wherein the end record of that chain includes type specific data;
   generating a second response to the second query that includes the MX record pointed to the type specific data of the end record of that chain; and
   transmitting the generated second response to the requester.

18. The non-transitory machine-readable storage medium of claim 3, further storing instructions that, when executed by the processor, cause the processor to perform the following operation: caching the generated first response.

* * * * *